US008289390B2

(12) United States Patent
Aggarwal et al.

(10) Patent No.: US 8,289,390 B2
(45) Date of Patent: Oct. 16, 2012

(54) METHOD AND APPARATUS FOR TOTAL SITUATIONAL AWARENESS AND MONITORING

(75) Inventors: Manoj Aggarwal, Lawrenceville, NJ (US); Keith Hanna, Princeton Junction, NJ (US); Harpreet Sawhney, West Windsor, NJ (US); Vincent Paragano, Yardley, PA (US); Rakesh Kumar, Monmouth Junction, NJ (US); Supun Samarasekera, Princeton, NJ (US); Aydin Arpa, Jacksonville, FL (US); Thomas Germano, Princeton Junction, NJ (US); Tao Zhao, Plainsboro, NJ (US); David Kalokitis, Robbinsville, NJ (US); David R. Patterson, Yardley, PA (US)

(73) Assignee: SRI International, Menlo Park, CA (US)

( * ) Notice: Subject to any disclaimer, the term of this patent is extended or adjusted under 35 U.S.C. 154(b) by 1590 days.

(21) Appl. No.: 11/192,486

(22) Filed: Jul. 28, 2005

(65) Prior Publication Data
US 2006/0279630 A1 Dec. 14, 2006

Related U.S. Application Data

(60) Provisional application No. 60/592,257, filed on Jul. 28, 2004.

(51) Int. Cl.
*H04N 7/18* (2006.01)
(52) U.S. Cl. .......... 348/143; 348/47; 348/155; 382/103; 382/154; 340/522; 386/326
(58) Field of Classification Search ................ 348/143, 348/47, 155; 382/130, 154; 340/522; 386/326; H04N 7/18
See application file for complete search history.

(56) References Cited

U.S. PATENT DOCUMENTS

| | | | | |
|---|---|---|---|---|
| 6,002,995 A | * | 12/1999 | Suzuki et al. | 702/188 |
| 6,359,647 B1 | | 3/2002 | Sengupta et al. | |
| 7,650,058 B1 | * | 1/2010 | Garoutte | 386/326 |
| 2003/0085992 A1 | * | 5/2003 | Arpa et al. | 348/47 |
| 2004/0017929 A1 | * | 1/2004 | Bramblet et al. | 382/103 |
| 2004/0119819 A1 | | 6/2004 | Aggarwal et al. | |
| 2004/0151366 A1 | * | 8/2004 | Nefian et al. | 382/154 |

(Continued)

OTHER PUBLICATIONS

D. Beymer, Person Counting Using Stereo, *Proc. IEEE Workshop on Human Motion*, 2000.

(Continued)

*Primary Examiner* — Sath V Perungavoor
*Assistant Examiner* — James Pontius
(74) *Attorney, Agent, or Firm* — Moser Taboada (57) ABSTRACT

A sentient system combines detection, tracking, and immersive visualization of a cluttered and crowded environment, such as an office building, terminal, or other enclosed site using a network of stereo cameras. A guard monitors the site using a live 3D model, which is updated from different directions using the multiple video streams. As a person moves within the view of a camera, the system detects its motion and tracks the person's path, it hands off the track to the next camera when the person goes out of that camera's view. Multiple people can be tracked simultaneously both within and across cameras, with each track shown on a map display. The track system includes a track map browser that displays the tracks of all moving objects as well as a history of recent tracks and a video flashlight viewer that displays live immersive video of any person that is being tracked.

15 Claims, 10 Drawing Sheets

U.S. PATENT DOCUMENTS

2004/0164858 A1* 8/2004 Lin ............................... 340/522
2005/0073585 A1* 4/2005 Ettinger et al. ............... 348/155

OTHER PUBLICATIONS

H. Tao, H.S. Sawhney and R. Kumar, Object Tracking with Bayesian Estimation of Dynamic Layer Representations, *IEEE Trans. on PAMI*, 24(1):75-89, 2002.

M. Harville and D. Li, Fast Integrated Person Tracking and Activity Recognition with Plan-View Templates form a Single Stero Camera, *Proc. IEEE Conf. CVPR*, 2004.

T. Zhao and R. Nevaytia, Tracking Multiple Humans in Complex Situations, *IEEE Trans. PAMI*, 26(9):1208-1221, 2004.

H. Pasula, S. Russell, M. Ostland and Y. Ritov, Tracking many objects with many sensors, *Proc. IJCAI*, 1999.

O. Javed, Z. Rasheed, K. Shafique and M. Shah, Tracking Across Multiple Cameras With Disjoint Views, *Proc. ICCV*, 2003.

H. Tao, H.S. Sawhney, R. Kumar, Dynamic Layer Representation with Applications to Tracking, *IEEE Computer Society Conference on Computer Vision and Pattern Recognition (CVPR)*, 02(2):2134, 2000.

D. Beymer and Konolige K. Tracking people from a mobile platform. *In IJCAI*, 2001.

* cited by examiner

METHOD AND APPARATUS FOR TOTAL SITUATIONAL AWARENESS AND MONITORING

CROSS-REFERENCE TO RELATED APPLICATIONS

This application claims the benefit of U.S. Provisional Application No. 60/592,257 filed on Jul. 28, 2004.

GOVERNMENT RIGHTS IN THIS INVENTION

This invention was made with U.S. government support under contract numbers N61339-03-C-0122 and NMA401-02-9-2001-0023. The U.S. government has certain rights in this invention.

BACKGROUND OF THE INVENTION

1. Field of the Invention

The invention relates generally to video systems and computer systems. More specifically, the invention relates to associating and maintaining identities over an extended period of time and providing total situational awareness and monitoring capabilities.

2. Description of the Related Art

In order to train war fighters for urban warfare, live exercises are held at various facilities. Commanders need to have situational awareness of the entire mock battlefield and also the individual actions of the various war fighters. The commands need to be able to provide instant feedback and play through different actions and what-if scenarios with the war fighters. The war fighters need to review their actions and rehearse different maneuvers.

There is a need for a system to track war fighters around an urban site using RFID and video-based tracking. Dynamic acquisition and recording of the precise location of individual troops and units during training would greatly aid the analysis of the training sessions, allowing improved review, critique, and instruction. More generally, there is a need for immersive situational awareness systems for monitoring a site with many additional applications.

Security forces at complex, sensitive installations like airports, railway stations, government buildings, military bases and public facilities can be hampered by outdated security systems that do little more than show disjointed closed circuit television pictures and the status of access points. A typical surveillance display, for example, is twelve videos of a scene shown in a 3×4 grid on a monitor. As the magnitude and severity of threats escalates, the need to respond rapidly and more effectively more complicated and dangerous tactical situations has become apparent. Simply installing more cameras, monitors and sensors quickly overwhelms the ability of security forces to comprehend the situation and take appropriate actions.

The challenge is particularly daunting for sites that the government must protect and defend. Merely asking personnel to be even more vigilant cannot reasonably guard enormous areas. In addition, as troops deploy, new security personnel (e.g., reserves) may be utilized who are less familiar with the facility. The solution lies in tools that act as force multipliers, raising the effectiveness of security personnel by integrating sensor inputs, brining potential threats to guards' attention, and presenting information in a context that speeds comprehension and response and reduces the need for extensive training. When security forces can understand the tactical situation more quickly, they are better able to focus on the threat and take the necessary actions to prevent an attack or reduce its consequences.

SUMMARY OF THE DISCLOSURE

Various deficiencies of the prior art are addressed by various exemplary embodiments of the present invention of a method and apparatus for total situational awareness and monitoring.

One embodiment is a method for total situational awareness and monitoring. Video streams are received from a network of monocular and stereo video cameras and identities are received from a plurality of sensors. A 3D model of a site is constructed by combining background portions of the video streams and overlaying foreground portions of the video streams over the 3D model. Objects, events, and identities are detected. The events and identities are associated with particular objects. Tracks for each object from the video cameras and sensors are fused into a global track for each object. A display of the 3D model is provided that includes the global tracks. Another embodiment is a computer readable medium having instructions stored thereon to perform this method.

Another embodiment is a system for total situational awareness and monitoring, including cameras and sensors, a global tracker resolver, and a visualizer and integrated graphical user interface (GUI). The cameras and sensors provide video streams and sensor information. The cameras include monocular and stereo cameras. The sensor information includes identification information. The global tracker resolver receives the video streams and sensor information, performs stereo computation, performs object tracking, performs track fusion of video and sensor information, and provides global tracks. Each global track is for a particular object that has an associated identity. The visualizer and integrated GUI display at least a portion of the global tracks on a map.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

One exemplary embodiment is a video flashlight system and algorithms for remote immersive monitoring of an urban site using a network of stereo video cameras. A 3D site model is constructed of the urban site and used as glue for combining the multiple video streams. Each video stream is overlaid on top of the video model using the recovered camera pose. Combining the various video streams, the background 3D model and the recovered 3D geometry of foreground objects generates virtual views of the scene. Each of the video cameras also has smart image processing associated with it, which allows it to detect moving and new objects in the scene and to recover their 3D geometry and pose with respect to the world model. The smart video processing can be programmed for detecting different suspicious behaviors. For instance, it can be programmed to detect left-behind objects in a scene, detect if moving objects (e.g., people, vehicles) are present in a locale or are moving in the wrong direction, count people passing through a zone and the like. These detected objects are highlighted on the 3D model and used as a cue to the operator to direct his viewpoint. The system can also automatically move to a virtual viewpoint that best highlights the alarm activity.

An exemplary embodiment is a system that associates and maintains identities over an extended period of time and provides total situational awareness and monitoring capabilities. This system is a sentient environment that provides total situational awareness and monitoring of a site using a blanket of stereo and monocular video cameras and other sensors. The system has an extensible immersive monitoring and visualization architecture to support immersive monitoring of an indoor site using tens to hundreds of cameras, monocular and stereo tracking. The system provides object re-acquisition and event recognition and hooks for interfaces to stand-alone identification systems, such as iris scanners, face recognition, RF tags, and fingerprint scanners. The system includes video and metadata databases that enable reasoning about events and intelligent alarm generation and a network-based controller that provides rule-based reasoning about components. In addition, there are methods for constructing a 3D model of a site and overlaying the 3D models with video feeds to allow a user to fly around the model and view the scene from arbitrary angles (i.e., a track visualizer).

Video Processing

Advanced computer vision techniques are used to reliably detect and track al the moving objects in the view of each pair of stereo cameras and to fuse the tracks viewed from different cameras together to form one consistent global track for each object in the monitored area.

Single Camera Tracking

A stereo object tracker is powered by the real time stereo computation and multi-object tracking technology to reliably detect multiple moving objects and accurately track their path simultaneously. Stereo cameras provide depth giving 3D information. This enables the image analysis to be done in a physical space instead of the image space, which results in a number of advantages. The combined depth and appearance analysis can differentiate the image motion caused by real moving objects and static objects. This greatly reduces the false detections caused by changes from big television displays or turning on or off lights, which is common in a typical indoor environment. It segments and tracks the motion of individual objects in a large group moving closely, which is important for monitoring sites of heavy traffic, such as a railway station or airport terminal. The algorithm matches the objects in an image by their learned shape, appearance, and depth models. Logic in the system handles severe object inter-occlusions and temporarily stopped objects robustly. The tracker provides 3D measurements of an object. It accurately measures its location, velocity, and physical height in the world along with other 3D shape statistics.

Multi-Camera Fusion

Multiple cameras are needed to monitor a large site. Object tracks from each individual camera are fused together to form a single consistent track, spanning across multiple cameras. Algorithms match the object tracks by the timing and appearance constraints. In this way, the object identity is carried from one camera to the next as the object moves. The multi-camera fusion module provides a full object-centric representation of the activities on the site being monitored. From a user point of view, there is only one mega-camera that covers the area of a network of individual cameras. For example, two persons following each other across a lobby and offices may be monitored using twelve pairs of stereo cameras. The two persons traverse all the cameras at least once. The global tracks of individual objects across a network of cameras enable the user to recognize suspicious behaviors that occur in the views of multiple cameras. Such an example is a person touring many offices on a floor of a building. The behavior is normal in any one office, but its suspiciousness is obvious when the information is presented jointly as a single track. In the same way, the activities can be analyzed automatically by event recognition techniques. The multi-camera fusion technique can also be used on other non-vision sensors, such as radio frequency identification (RFID) sensors and biometric sensors. The sensor locations on the site map need to be known and time-synchronized with the camera system.

Figure 1:
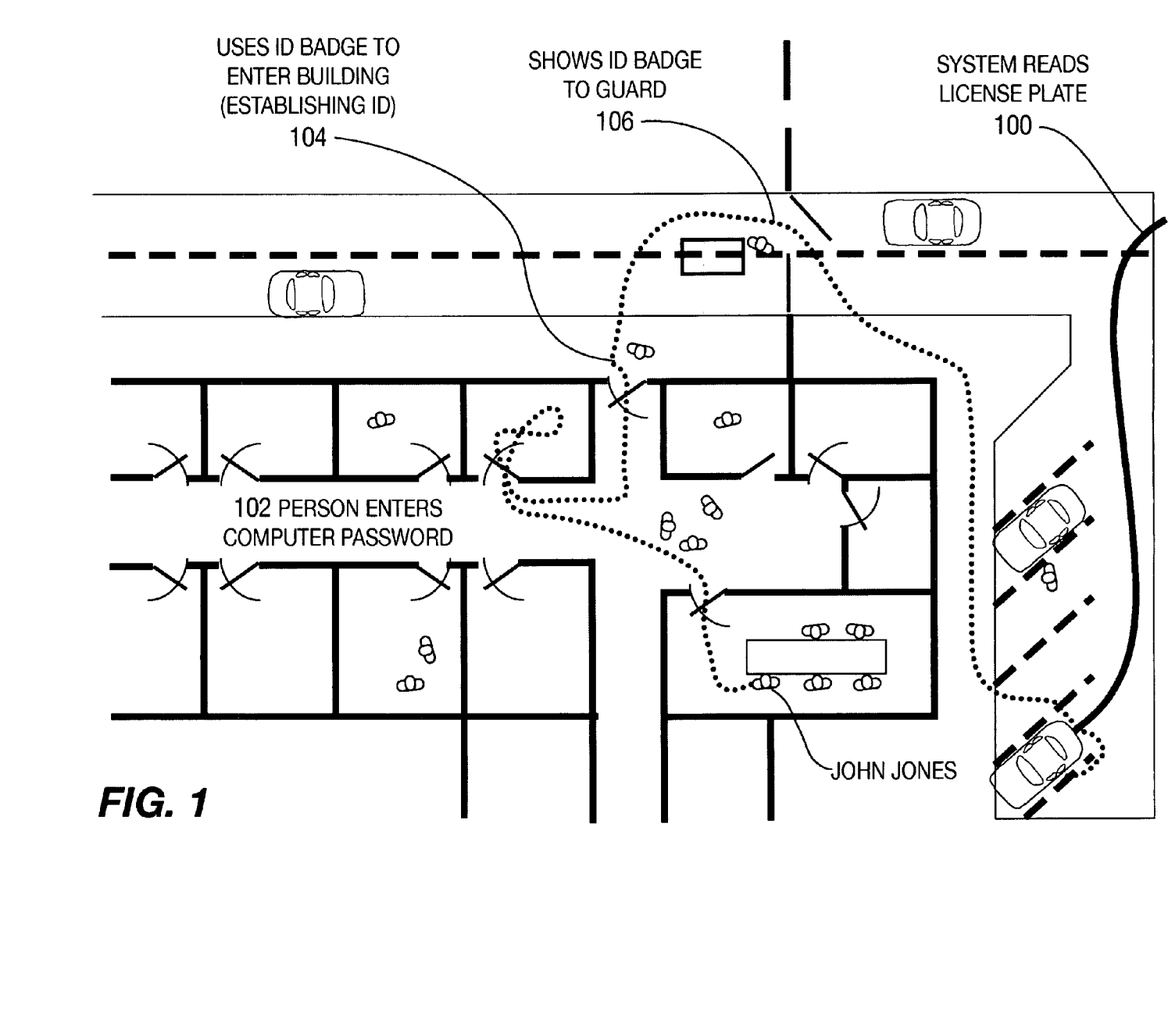
FIG. 1 is an illustration that illustrates the concept of continual tracking throughout an exemplary scene using various forms of identification.

FIG. 1 illustrates the concept of continual tracking throughout an exemplary scene using various forms of identification. In this example, John Jones is continually tracked by various methods, i.e., a license plate reader 100, a computer password 102, a card-swipe for an ID badge 104, and a guard 106.

Figure 2:
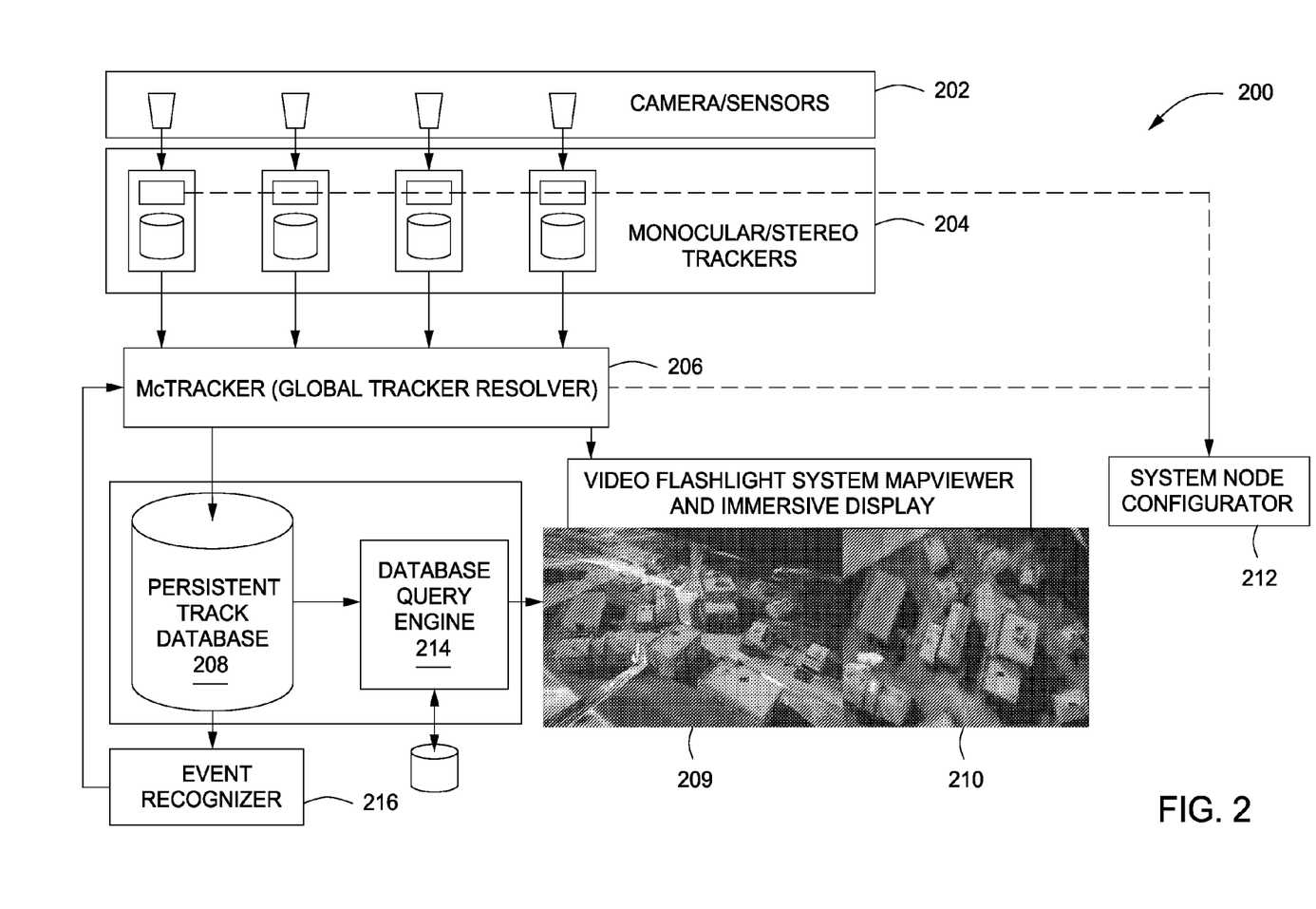
FIG. 2 is a block diagram illustrating an exemplary logical processing structure for an exemplary embodiment of a system that associates and maintains identities over an extended period of time and provides total situational awareness and monitoring capabilities.

FIG. 2 illustrates an exemplary logical processing structure for an exemplary embodiment of a system 200 that associates and maintains identities over an extended period of time and provides total situational awareness and monitoring capabilities. Cameras and sensors 202 have corresponding trackers 204 that feed information into a global tracker resolver (a/k/a McTracker module) 206, which resolves tracks globally, based on information that included the location of the sensor and a feature set derived from each sensor (e.g., the feature set may be as simple as time of day in some cases). Tracks are stored in a persistent track database 208. Tracks can be visualized using a display system, such as a video flashlight system mapviewer 209 and immersive display 210. A system node configurator 212 configures various components of the system 200. A database query engine 214 executes queries on the database 208. An event recognizer 216 analyzes data in the database 208 and provides events and alarms to the McTracker module 206.

An exemplary embodiment is a sentient system that combines comprehensive detection and tracking of all moving objects and provides immersive visualization of a cluttered and crowded environment using a network of stereo cameras. A guard monitors the site using a live 3D model, which is constantly being updated from different directions using the multiple video streams. The guard can monitor the site from a bird's eye view or fly down and zoom in to observe an activity of interest. Smart processing is used to analyze stereo video streams to detect and track all moving objects in cluttered environments. The system is designed specifically to monitor moving people within a localized environment such as an office building, terminal, or other enclosed site. As a person moves within the view of a camera, the system detects the person's motion and tracks the person's path, it hands off the track to the next camera when the person goes out of that camera's view. Multiple people can be tracked simultaneously both within and across cameras, with each track shown in a different color on a map display. The track system includes two side-by-side displays: a track map browser and a video flashlight viewer. The track map browser displays the tracks of all moving objects as well as a history of recent tracks and the video flashlight viewer displays live immersive video of any person that is being tracked. The user can click on a person and either automatically follows him or goes back in time and sees where he came from. All tracks are stored in a database, which can be used for data mining purposes.

In an exemplary embodiment, time-coded video feeds are captured and stored in digital video servers. The videos are streamed to both the video processing (tracker) PCs and the video flashlight PC over a network. The output (tracks) of the tracker PCs are stored in a track database and, at the same time, displayed on the track map browser. Up to twelve live video feeds are captured and stored in real time to a digital video server. Of course, many more live video feeds are used in some embodiment and there is no limit on the number of live video feeds. The videos are compressed and stored with time codes. The digital server supports full random access with a minimal latency. The video frames are streamed through the network upon request. Each tracker PC processes up to two pairs of stereo cameras (i.e., four video feeds). Stereo computation and object tracking are done in real time. The cameras are pre-calibrated so that their spatial relationship is known for track fusion. The single camera trackers send local tracks to the multi-camera fusion module, in which local tracks belonging to the same objects are fused. The fused tracks are sent to the track map browser and stored in a track database with information about the tracks, such as time, path, and ID. The track map browser takes input either from the video tracker or from the track database and displays the tracks on a two-dimensional map. The track map browser may be run from a remote machine with a network connection to the system. In the flashlight video display, live or replayed video feeds are streamed from the digital video servers. Different video streams are synchronized using the associated time codes. The 3D model of the scene is also stored on the PC.

An exemplary embodiment is a system including between 1-16 stereo video feeds as input, 2 display units and speakers. The system also includes a rack plus additional space for two display stations and the processing platform includes 8 PCs, 4 stereo boxes, 4 digital video recorders, and 2 ultra wide band (UWB) RFID hubs, 8 receivers, and 10 RFID cards. The system includes a video flashlight browser, stereo based multi-camera tracker and database, and a map based iconic track display or browser. The video flashlight display or browser includes a real time display of 1-16 video feeds overlaid over a site model, fully interactive 3D navigation, full-screen video of any one video feed and conventional security display (video matrix), instant playback of up to 12 hours of video from all the cameras, keyboard shortcuts for user selected views, and cycle modes across user selected views. The stereo based multi-camera tracker and database includes stereo tracking on 12 fixed stereo cameras (on 6 PCs), stereo tracking on 4 fixed stereo cameras (4 PC nodes), and a database of tracks (metadata including track object location and video clips). The map based iconic track display or browser includes real time display of tracks due to object motion observed in 1-12 video feeds and 4 fixed PC node feeds, user steered remote control of the video flashlight browser based on track displays, and the ability to view the database through the track browser. The system additionally includes a person location and ID tracker including video based multi-camera tracker and database, UWB based RFID tracker, a McTracker that performs fusion of RFID and video tracks, and the database of tracks. The RFID tracker handles about 10 tags simultaneously with 8 receivers and 2 hubs.

Figure 3:
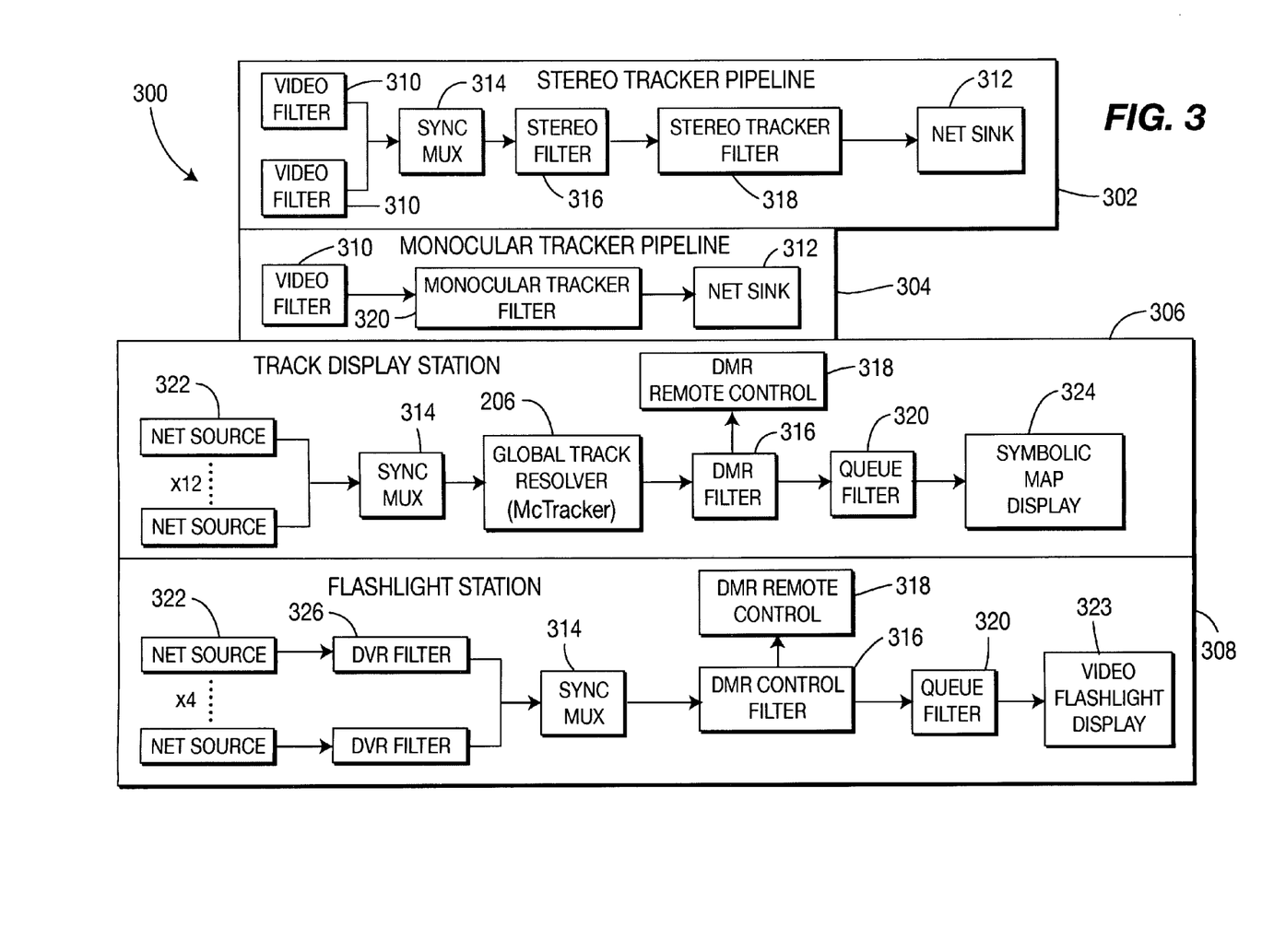
FIG. 3 is a block diagram illustrating an exemplary software component design for an exemplary embodiment of a system that associates and maintains identities over an extended period of time and provides total situational awareness and monitoring capabilities.

FIG. 3 illustrates an exemplary software component design for an exemplary embodiment of a system 300 that associates and maintains identities over an extended period of time and provides total situational awareness and monitoring capabilities. There are four components: a stereo tracker pipeline 302, a monocular tracker pipeline 304, a track display station 306, and a flashlight station 308.

In FIG. 3, the stereo tracker pipeline 302 receives videos from a stereo pair which are digitized by stereo video filters 310. The digitized video from the stereo pair are time-synchronized by the synchronizing multiplexer 314. The time-synchronized video is then further processed by the stereo filter 316 to produce disparity maps. The disparity maps and the digitized video are then processed further by the stereo tracker filter 318 to detect and track objects. The output track data is then communicated to a central global rack resolver (McTracker) via netsink 312. A netsink 312 takes the track information generated by the stereo tracker filters 318 and communicates the track information to another machine. Netsink and netsources are paired together to form a connection. For example, given, 4 stereo tracker pipelines, each netsinks tracks that go to another netsource, which is responsible for receiving it. A video filter 310 is a software module that receives video from a camera and converts it to digital form for processing. A synchronizing multiplexer 314 takes multiple video streams that have been captured and time-synchronizes them together. Stereo filters 316 take video from each of the right and left cameras and compute a disparity map between them. A stereo tracker filter 316 uses the disparity map from the stereo filter and the video from video filter to perform detection and tracking of objects in the scene.

In FIG. 3, the monocular tracker pipeline 304 receives input monocular video filters 310 and processes them to produce output monocular track streams at the netsink 312. The processing is performed by a monocular tracker filter 320.

In FIG. 3, the track display station 306 receives and processes the output stereo track streams and the output monocular track streams at net sources 322 to provide a plurality of global tracks and local tracks for display on a symbolic map display 324. The processing is performed by a synchronizing multiplexer 314, a global track resolver (McTracker) 206, a DMR filter 316 (including a DMR remote control 318), and a queue filter 320. A DMR filter 316 is a software module that controls digital video recorders and digital metadata (i.e., tracks) recorders. A queue filter 320 is essentially a buffer. The track display station 306 includes the following features: scrollable and zoomable graphical user interface (GUI) components, drawing the most recent points with a higher alpha value to show direction and speed, tracks fade out over time and disappear, direction arrows appear on selected tracks, displays can be replayed and animated, and video flashlights and display videos can be cued to form context menus. Tracks are shown in either a list display or as a timeline display, in some embodiments.

In FIG. 3, the flashlight station 308 receives and processes the output track streams at the net sources 322 and provides a display for the video flashlight display 323. A video flashlight display 323 has a 3D model of the scene with all the videos combined into the 3D model with navigation capabilities, such as a bird's eye view and close up detail. By contrast, the symbolic map display 324 has a two dimensional map of the scene with overlaid tracks. Tracks are symbolic information. (See FIG. 10.)

The symbolic map display 324 includes a map display, a list display, and a video display. The map display includes a map overlaid with the global tracks and the local tracks. The list display includes a hierarchical table having the global tracks at a root level and local tracks at an inner level. The video display includes an option to display live video associated with a selected global track. Processing at the flashlight station 308 is performed by digital video recorder (DVR) filters 326, a synchronizing multiplexer 314, a DMR control filter 316, and a queue filter.

Figure 4:
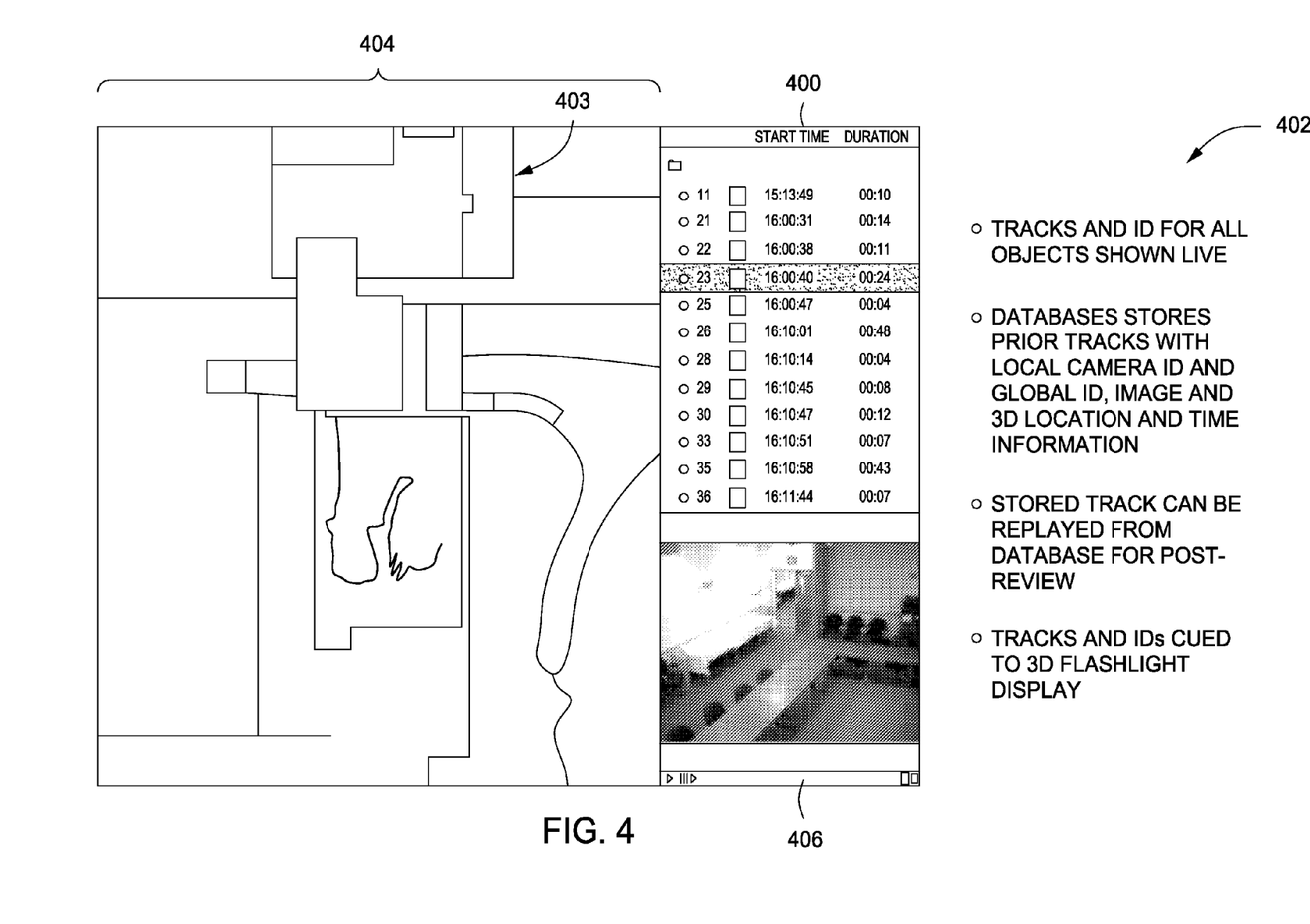
FIGS. 4 and 5 are illustrations of exemplary list displays.
Figure 5:
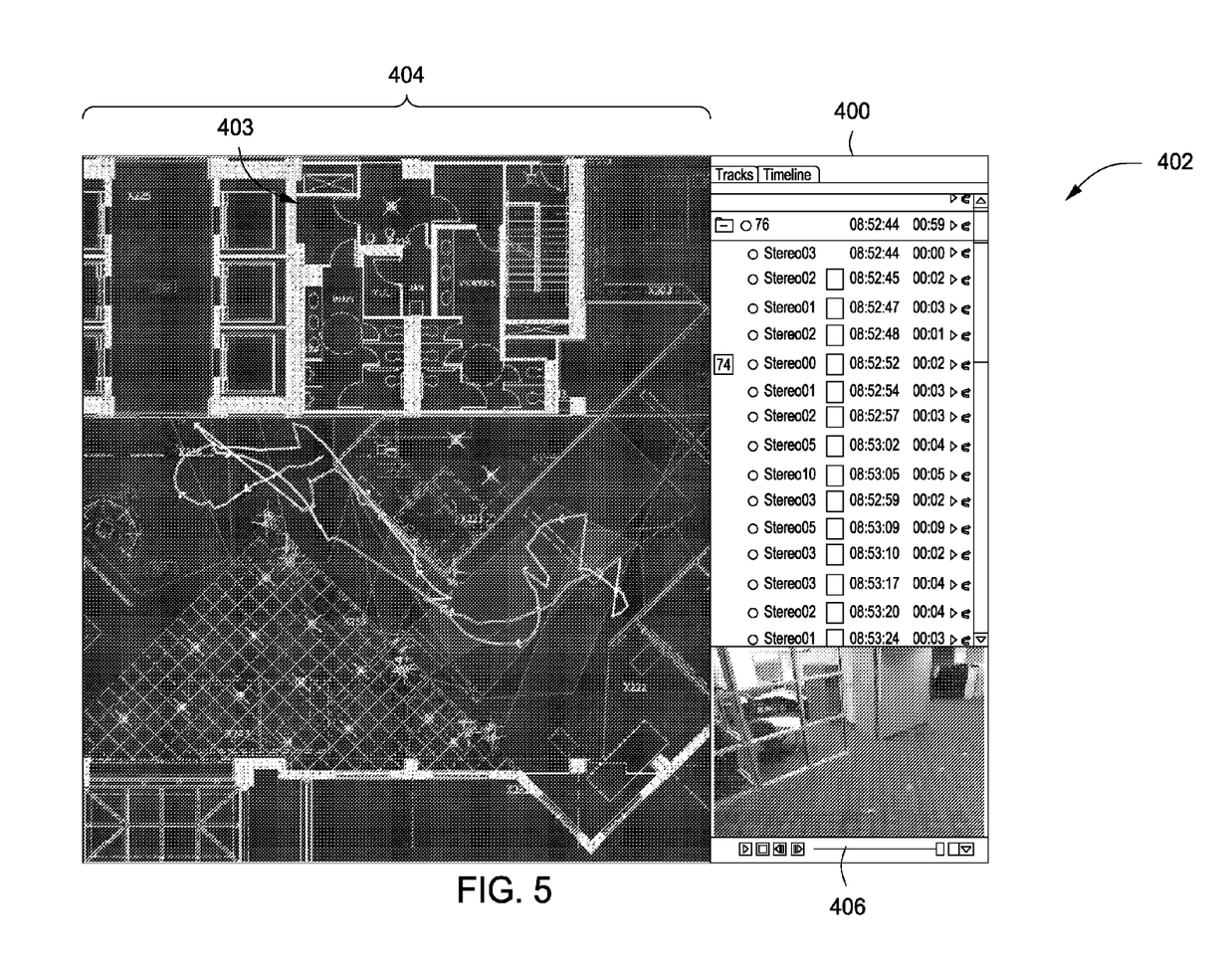

FIGS. 4 and 5 illustrate exemplary list displays 400. The list display 400 includes a hierarchical table showing global tracks at the root level and local tracks at the inner level. If biometric information is available, the global tracks are nested inside the unique person ID. The list display 400 displays other statistics including length of tracks and links to play movies and cue a video flashlight rendering display. FIG. 4 shows a track map browser interface 402. The track map browser 402 displays abstract activities (e.g., tracks, alarms) within the site. The track map browser 402 overlays the object tracks on an annotated two-dimensional floor map 403. The track map browser 402 serves as an interface between the track database and the user. The track map browser 402 includes the following components: a track list 400, a track view 404, a track query engine (not shown), and a timeline view (See FIG. 6).

The track list 400 shows the information (e.g., ID, start time, duration) of a list of recent tracks in the track database. The tracks are organized in a hierarchical manner. The top level shows the RFID number. It contains multiple RFID tracks and fused video tracks of the person with that RFID. Each of the RFID tracks or video tracks are further expandable into their constituent local tracks from individual sensor (e.g., video cameras or RF systems). Thumbnails of video tracks are also shown. For each track in the list, the user can select and show it in the track view, play the low bit rate video file or seek the video flashlight system 406 to review the immersive video of the object by following the person through all the cameras that the person went to.

In FIG. 5, the track view 404 is a scrollable or zoomable annotated floor map with the evolution of the object tracks overlaid. The tracks, with different objects in different colors, appear in the map as the objects enter the monitored area in real time. It can also replay all or selected activities from a certain time in history that are stored in the track database. The user can also click to select certain track locations (e.g., a certain camera footprint or draw a region).

The track query engine is part of the track map browser 402 and used to search the track database with various criteria. The query criteria include start time, end time, ID, path, and their logical combinations (e.g., tracks before 6:00 a.m. and went to the office) and sequential orderings (e.g., tracks went to reception desk then to the office). The tracks that match the criteria are displayed in the track list and track view.

The timeline view (See FIG. 6) includes the durations of all the tracks plotted along a time axis. This view conveniently shows the number of objects in the site at any given time. The user can scroll the time axis to replay the activities both in the track view and in the associated video flashlight display 406.

Figure 6:
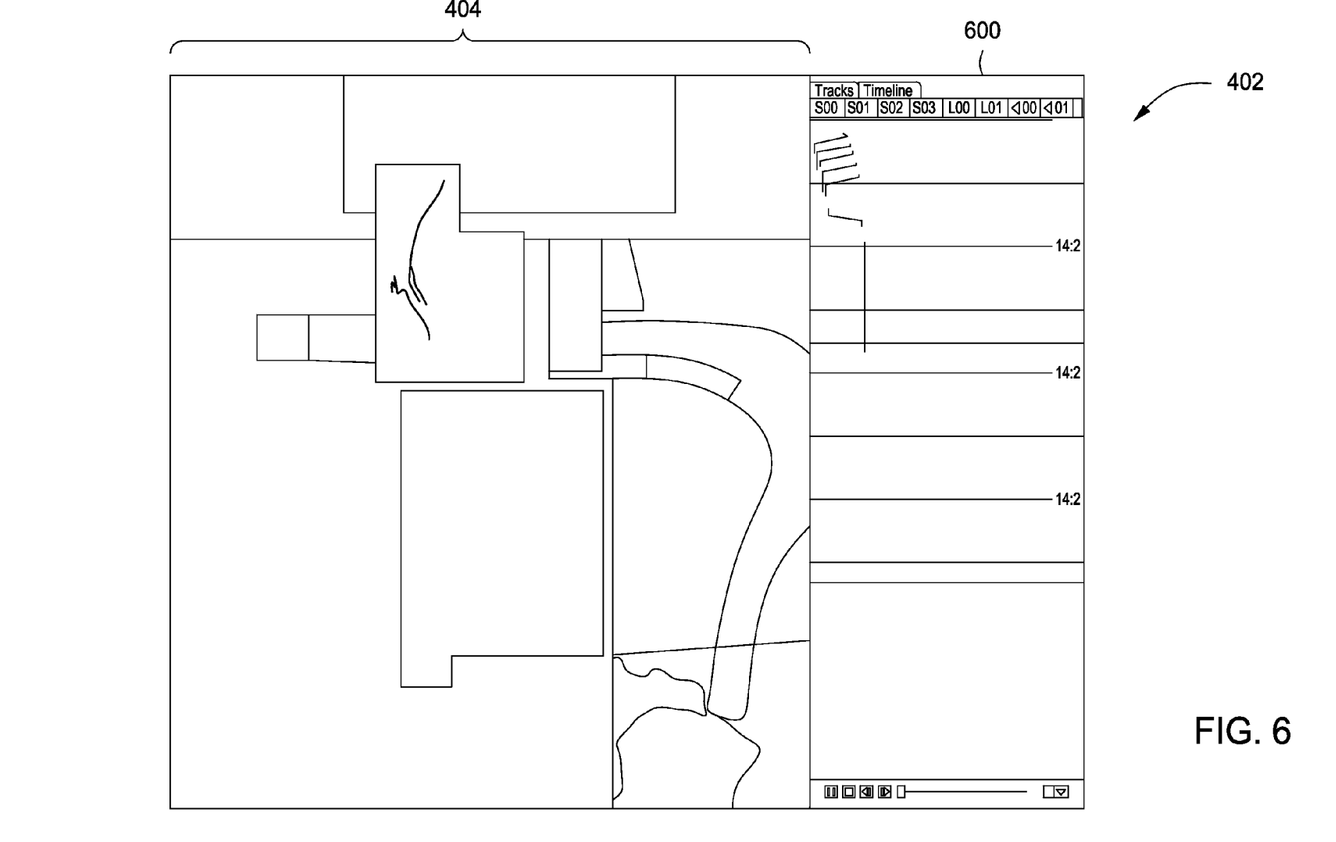
FIGS. 6 and 7 are illustrations of exemplary timeline displays.
Figure 7:
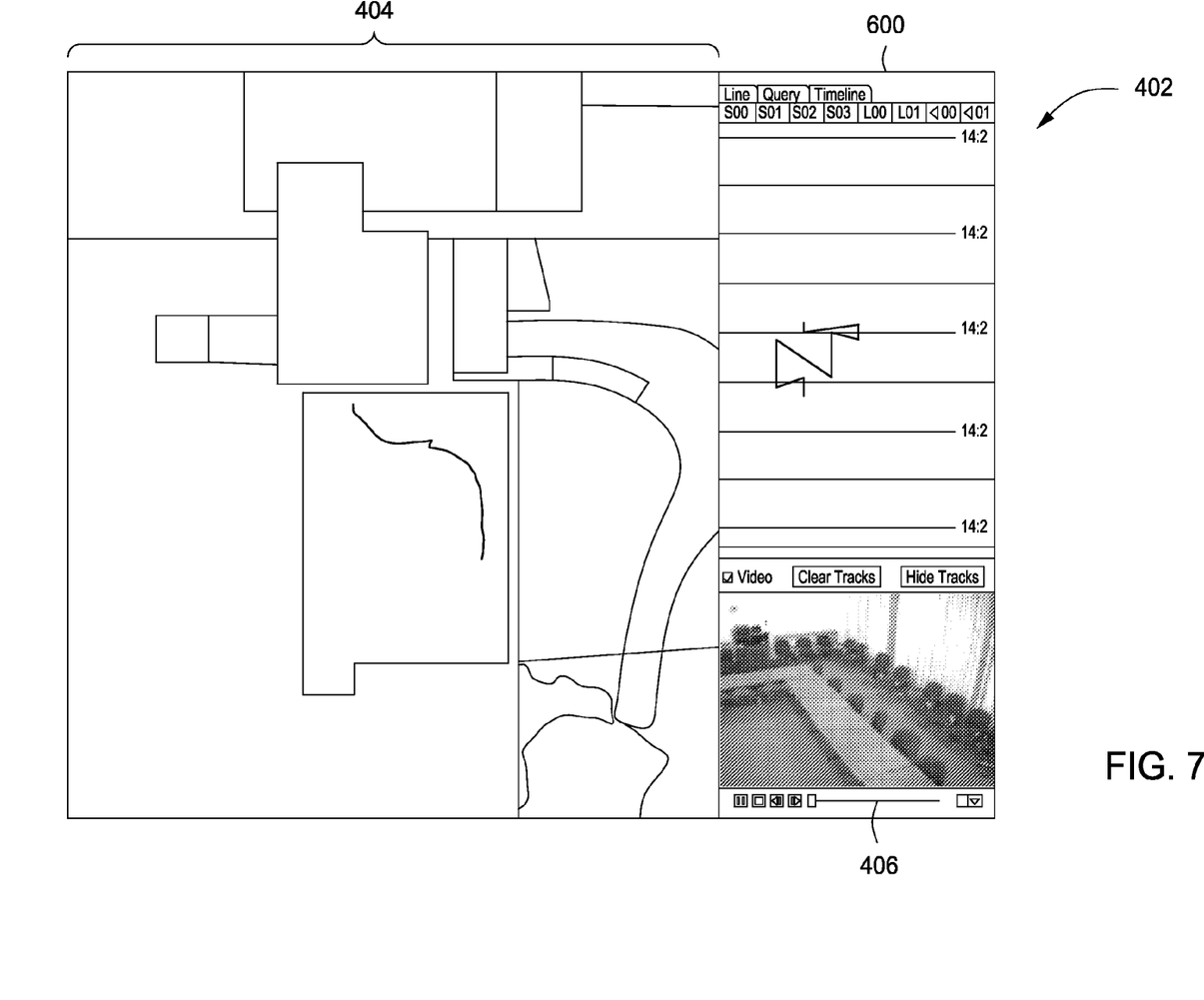

FIGS. 6 and 7 illustrate exemplary timeline displays 600. FIGS. 6 and 7 show raw tracks on the left and tracks by timeline 600 on the right of the displays. FIG. 7 shows a video flashlight system 406 in the lower left of the display. Tracks on the time line 600 part of the displays move from column to column to indicate that an object is moving from one camera view to another camera view. The labels at the top of the timeline correspond to different camera views. In one embodiment, the timeline display 600 displays track locations by when they occurred and what camera viewed them. Tracks are connected among columns by their local tracks. Columns can be arranged to visualize specific paths through cameras or sectors. Time is both scrollable and zoomable to handle high density data. Viewpoint scrolls with the current time are available in live mode. Green and blue horizontal line indicators showing the current view time and real world time respectively blend to cyan when tracking the current time, in some embodiments.

Figure 8:
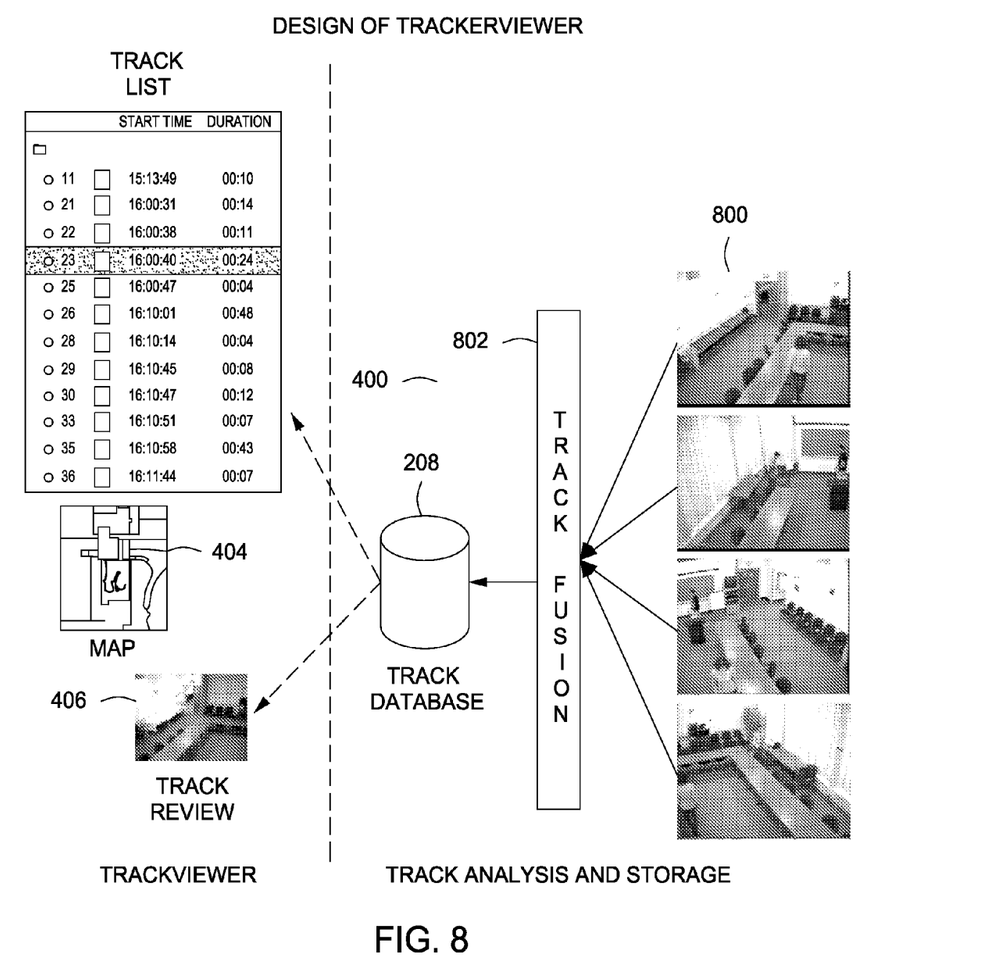
FIG. 8 is an illustration of an exemplary process for reading tracks from a track database and displaying them on a track viewer.

FIG. 8 illustrates an exemplary process for reading tracks from a track database and displaying them on a track viewer. Video streams 800 come into a track fusion component 802 and are stored in a track database 208. The track database 804 provides information for the track list 400 and track review for video flashlight system 406 displays on the trackviewer display corresponding to the map 404 also on the trackviewer display.

Figure 9:
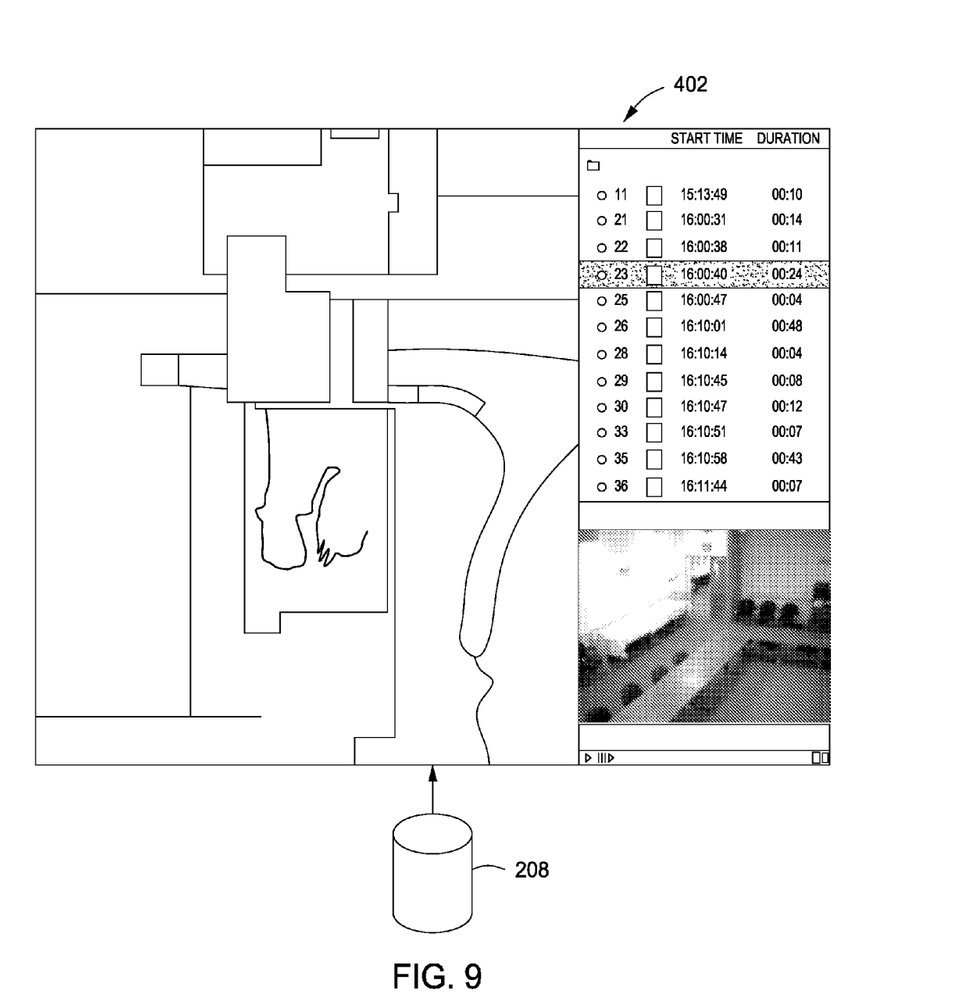
FIG. 9 is an illustration of exemplary processes for displaying tracks in a live display, displaying tracks that are being reviewed, or displaying previously acquired tracks that are being played back.

FIG. 9 illustrates exemplary processes for displaying tracks in a live display, displaying tracks that are being reviewed, or displaying previously acquired tracks that are being played back. In this example, as activity progresses in live mode, all tracks are updated on the map and old tracks are slowly dimmed away. The tracks from multiple cameras with identical global IDs are organized into a tree-like structure. A thumbnail of the tracked person is displayed with each track. Post activity review mode is initiated by clicking on the desired track entry on the list. The selected track is highlighted on the map. The track video viewer replays a composited video clip from all the cameras that the object went through. The video flashlight is cued to replay a personalized tour of the recorded activity from digital video recorders (DVRs).

Figure 10:
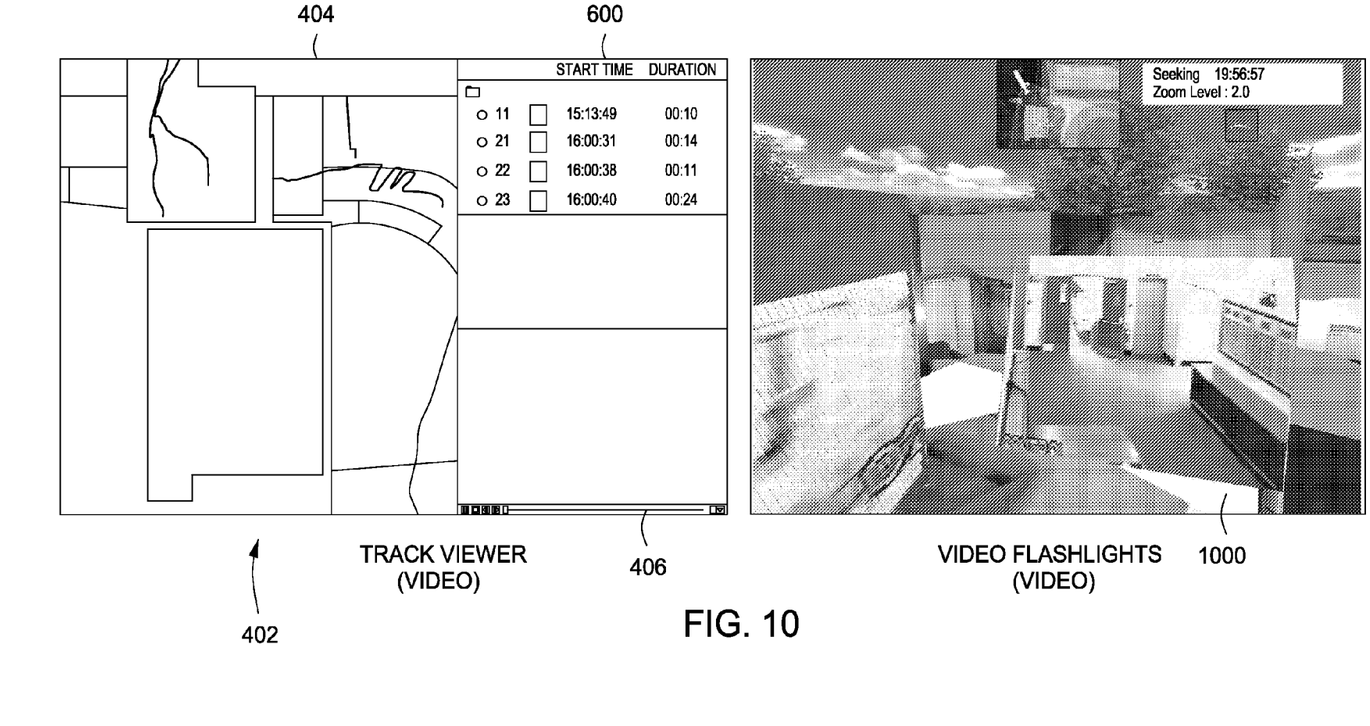
FIG. 10 is an illustration of an exemplary process for using a track to cue a particular view in a video flashlight display.

FIG. 10 illustrates using a track to cue a particular view in a video flashlight display. A track is selected from the track list 400 and displayed on a video flashlight display 1000. The video flashlight system captures and represents 3D models, static and dynamic camera views, moving objects and events in a coherent global coordinate system for enhanced interactive visualization. Through model-based video interaction and virtual camera rendering, the user can see all the activity from a bird's eye view or zoom-in and watch a particular activity up close. The user can also review past events in order to view them from different perspectives or to follow certain individuals in both space and time. In video flashlight, each video frame for each camera is used as a dynamic texture map that is overlaid on the 3D site model. Camera pose is automatically computed for moving cameras (e.g., pan-tilt-zoom or aerial) to ensure precise alignment of camera views to the model and to other cameras. The virtual camera rendering system described above appropriately handles occlusions and surface visibility. The video flashlight displays integrate hundreds of sensors in a unified view, moves seamlessly in space from a god's eye view to up close, moves seamlessly in time to replay and rehearse, alerts operators to key events, identifies individuals, tracks and overlays, records, compresses, and stores, archives, and data mines.

In one exemplary embodiment, training, mission planning, and mission execution for warfare in urban battlefields is enhanced by global visualization of individual war fighters and their tracks within the global context of a 3D model. In order to train war fighters for urban warfare, live exercises are held at various facilities. Commanders have situational awareness of the entire mock battlefield and also the individual actions of the various war fighters. The commanders provide instant feedback and play through different actions and what-if scenarios with the war fighters. The war fighters review their actions and rehearse different maneuvers. Video cameras and other sensors (e.g., global positioning system (GPS) and radio frequency identification (RFID) tags) are distributed around the training site or worn by war fighters to capture information for mission rehearsal and review. Hundreds of cameras and other sensors may need to be deployed at a complex site. Video and other data is fused a registered into a common dynamic 3D representation of the facility that can be manipulated and viewed from any direction. Past actions can be queried, such as what was the formation of war fighters at one end of the building when another group was entering at the other end.

In this exemplary embodiment, an immersive situational awareness system uses video-based wide area tracking and immersive visualizations for monitoring of a site using a network of monocular and stereo video cameras and an ultra-wideband based RFID monitoring and localization system. All the moving objects in the monitored area are detected and tracked by the combination of RFID and video trackers. Multiple tracks corresponding to the same object are fused to form a single global track. The system tracks multiple objects that are close to one another simultaneously. The object tracks are stored in a database. The system performs many functions, such as tagging each individual with a unique ID using the RFID system, tracking and locating individuals within a domain of interest, associating IDs with visual appearance derived from live videos, visualizing movement and actions of individuals within the context of a 3D model, and storing and reviewing activities with (x,y,ID) information associated with each individual.

In this exemplary embodiment, the guard monitors the site using two side-by-side displays. A track map browser displays symbolic tracks of all moving objects as well as a history of recent tracks. The display provides an interface for the user to browse, review, and query the live tracks or tracks stored in the track database. The video flashlight viewer displays live or recorded immersive videos from all the cameras projected onto a 3D site model. The site may be monitored from any virtual viewpoint. The user can see or review an activity from far away and get a bird's eye view or fly or zoom in and see it up close. The two displays also work cooperatively; the video flashlight can be cued by the track map browser to replay the reconstructed immersive video associated with a track or an alarm. The system includes an integrated digital video recorder (DVR) that allows that video blanket browser to instantly replay video from fixed cameras onto the display to drape appropriately on top of the 3D model. Features for precise location and identification of the participating personnel and hardware involved are also provided.

In this exemplary embodiment, the RF- and video-based systems have complimentary advantages. The RF-based system provides a unique ID for each individual and tracks objects accurately. However, the RF-based system does not provide a visual image of the person being tracked and gives the user an impoverished visualization of the scene. Improved visualization is obtained by integrating the RF system with a video tracking and flashlight system. Video cameras capture videos of the dynamic action from many different locations. Associating locations from the RF tracking system with the video flashlight system enables the correct video stream to be indexed for each person being tracked. However, it still does not enable matching a visual icon of the person with the RF track. For this the visual track information is fused with the RF track information. For each tracked person or object, a visual icon is segmented from the scene. These segmented visual icons are associated with the RF tracks. Combining the two tracking systems enables the system to locate, identify all tracked persons and vehicles visually and mark their locations in the video streams with their images. For RFID, the exemplary training system utilizes an UWB-based system that permits subfoot accurate localization, even in the presence of sever multipath. The UWB tracking system provides continuity of identification across visually obscured boundaries, permitting transparent hand-off to the vision-based tracking component.

For military tasks, it is important not only to be able to watch the exercises as it they are happening, but also to review and evaluate them afterwards. This exemplary embodiment includes a two-level visualization system that provides both an iconic view of the overall exercise and a detailed view of any particular detail, both in the online and in the review modes. The system includes two side-by-side displays: the track map browser and the video flashlight. The track map browser displays the tracks of all moving objects as well as a history of recent tracks. The video flashlight viewer displays immersive video of any person that is being tracked from different viewing perspectives. With the visualization system, navigation both in space and time are facilitated for examining closely any detail of the training exercise.

An exemplary embodiment is a sentient environment powered by video-based wide-area tracking and immersive visualization technologies represents a new and highly effective method for automatically and comprehensively monitoring an enclosed indoor environment. Sophisticated video image processing techniques are used to reliably detect and track all the moving objects in a cluttered environment and fuse object tracks across a network of sensors. This effectively results in a single mega-sensor that covers the entire area monitored by many individual sensors. A two-dimensional track map browser and a 3D video flashlight viewer visualize the symbolic tracks and immersive video and provide the user with interfaces to exploit the track and video in a structured way. The system allows fewer and less trained people to be more effective in security monitoring. It also allows activities over a large temporal or spatial scale to be analyzed more effectively both by people and automatically. The sentient environment represents that type of advanced technology that must be brought to bear to provide security in today's insecure world.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A computer implemented method for situational awareness and monitoring, comprising:
   using at least one computer for:
      receiving a plurality of video streams from a network of monocular and stereo video cameras;

receiving position information and identifying information from a plurality of non-vision sensors;

detecting a plurality of objects and corresponding the objects with the identifying information;

tracking each object using the plurality of video streams, position information and the identifying information to form a plurality of tracks for each object;

fusing the plurality of tracks for each object into a global track for each object by associating identifying information in the plurality of tracks for each object to form a plurality of global tracks;

providing a first display of a 3D model and a map display overlaid with at least a portion of the plurality of global tracks, the 3D model being of a site overlaid with a plurality of video streams; and providing a second display, proximate to the first display, of a list of recently fused tracks.

2. The method of claim 1, wherein each non-vision sensor is associated with a radio frequency (RF) or biometric identification system.

3. The method of claim 1, further comprising: segmenting each object from within the plurality of objects.

4. The method of claim 1, further comprising: matching each object with a learned shape, appearance, and depth.

5. The method of claim 1, further comprising: carrying forward an identity of each object from one video camera to a next video camera as the object moves, the identity of each object being associated with the global track of that object.

6. The method of claim 1, further comprising: measuring a location, velocity, and height of each object.

7. The method of claim 1, further comprising: storing the global tracks in a database; and providing a tool for reviewing stored global tracks in the display.

8. A system for situational awareness and monitoring, comprising:

a plurality of cameras and non-vision sensors configured to provide video streams and non-vision sensor information for detecting a plurality of objects, the non-vision sensor information including position information and identifying information corresponding to the detected objects;

a tracker pipeline configured to perform stereo computation and to perform object tracking to form a plurality of tracks for each object;

a global tracker resolver configured to receive the non-vision sensor position information, the identifying information and the plurality of tracks for each object from the tracker pipeline, to perform track fusion of video and non-vision sensor position information and identifying information into a global track for each object by associating identifying information in the plurality of tracks for each object to form a plurality of global tracks, each global track being for a particular object; and a visualizer and integrated graphical user interface (GUI) configured to provide a 3D model of a site overlaid with a plurality of video streams and a map overlaid with at least a portion of the plurality of global tracks and to provide a proximate display of a list of recently fused tracks.

9. The system of claim 8, wherein each non-vision sensor is associated with a radio frequency (RF) or biometric identification system.

10. The system of claim 8, further comprising: a database to store the global tracks; and a database query engine to retrieve the stored global tracks and to provide query results to be displayed by the visualizer and integrated GUI.

11. The system of claim 10, further comprising: an event recognizer to retrieve the stored global tracks and to provide events to be associated with the global tracks by the global tracker resolver and to be displayed by the visualizer and integrated GUI.

12. The system of claim 8, wherein the visualizer and integrated GUI provides an option to display a recent history associated with a selected global track.

13. The system of claim 8, wherein the visualizer and integrated GUI provides an option to display a live video associated with a selected global track.

14. The system of claim 8, wherein the visualizer and integrated GUI provides a timeline of at least a portion of the global tracks.

15. A non-transitory computer readable storage medium having stored thereon a computer program encoded with instructions, causing at least one computer to execute code for:

receiving a plurality of video streams from a network of monocular and stereo video cameras;

receiving position information and identifying information from a plurality of non-vision sensors;

detecting a plurality of objects and corresponding the objects with the identifying information;

tracking each object to form a plurality of tracks for each object using the plurality of video streams, position information and the identifying information;

fusing the plurality of tracks for each object into a global track for each object by associating identifying information across the plurality of tracks for each object to form a plurality of global tracks;

providing a display of a 3D model and a map display overlaid with at least a portion of the plurality of global tracks, the 3D model being of a site overlaid with a plurality of video streams; and providing a second display, proximate to the first display, of a list of recently fused tracks.

* * * * *